US012750100B2

(12) United States Patent
Zhang et al.

(10) Patent No.: US 12,750,100 B2
(45) Date of Patent: Sep. 29, 2026

(54) DATA TRANSMISSION METHOD AND APPARATUS

(71) Applicant: HUAWEI TECHNOLOGIES CO., LTD., Shenzhen (CN)

(72) Inventors: Qingchuan Zhang, Shenzhen (CN); Jiachong Zhou, Shanghai (CN); Xiaolong Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 59 days.

(21) Appl. No.: 18/895,852

(22) Filed: Sep. 25, 2024

(65) Prior Publication Data

US 2025/0023607 A1 Jan. 16, 2025

Related U.S. Application Data

(63) Continuation of application No. PCT/CN2023/081061, filed on Mar. 13, 2023.

(30) Foreign Application Priority Data

Mar. 31, 2022 (CN) ......................... 202210346687.9

(51) Int. Cl.
*H04L 27/28* (2006.01)
*H04B 7/0456* (2017.01)

(52) U.S. Cl.
CPC .................................. *H04B 7/0456* (2013.01)

(58) Field of Classification Search
CPC .. H04B 7/0456; H04B 7/0691; H04B 7/0414; H04B 7/0639; H04B 7/0626; H04B 7/0413; H04W 72/23; H04W 24/10; H04L 5/0026; H04L 5/0051
USPC ................................. 375/260, 262, 267, 299
See application file for complete search history.

(56) References Cited

U.S. PATENT DOCUMENTS

| | | | | |
|---|---|---|---|---|
| 10,469,142 | B2 | 11/2019 | Faxer et al. | |
| 2012/0314806 | A1 | 12/2012 | Kang et al. | |
| 2013/0286884 | A1* | 10/2013 | Li ........................ | H04B 7/0417 370/252 |
| 2018/0123659 | A1* | 5/2018 | Qian ........................ | H04B 7/06 |
| 2020/0322933 | A1* | 10/2020 | Zhang .................. | H04B 7/0639 |
| 2021/0359731 | A1 | 11/2021 | Sahraei et al. | |
| 2022/0094412 | A1* | 3/2022 | Ren ....................... | H04L 5/0057 |

FOREIGN PATENT DOCUMENTS

| | | | |
|---|---|---|---|
| WO | 2021205206 | A1 | 10/2021 |
| WO | 2021238634 | A1 | 12/2021 |

* cited by examiner

*Primary Examiner* — Khai Tran
(74) *Attorney, Agent, or Firm* — Maier & Maier, PLLC

(57) ABSTRACT

A data transmission method and apparatus. The method includes: determining a second weight matrix based on a first weight matrix indicated by a first PMI fed back by a terminal, and then converting the second weight matrix into a non-equal power weight matrix based on a non-equal coefficient matrix, so that a network device can send data with non-equal power on different radio frequency channels. This improves power utilization, implements a better beam side lobe, better mitigates a performance loss caused by inaccurate channel information, and improves data transmission quality.

14 Claims, 3 Drawing Sheets

DATA TRANSMISSION METHOD AND APPARATUS

CROSS-REFERENCE TO RELATED APPLICATIONS

This application is a continuation of International Application No. PCT/CN2023/081061, filed on Mar. 13, 2023, which claims priority to Chinese Patent Application No. 202210346687.9, filed on Mar. 31, 2022. The disclosures of the aforementioned applications are hereby incorporated by reference in their entireties.

TECHNICAL FIELD

Embodiments relate to the communication field, and to a data transmission method and apparatus.

BACKGROUND

A multi-antenna multiple-input multiple-output (MIMO) technology is a key technology in current 5G and 4G communication systems. In the technology, a plurality of antennas configured on a base station side and a plurality of antennas configured on a terminal side are used, to independently send signals on the plurality of antennas at the transmit end, and receive and restore original information on the plurality of antennas at the receive end. This may greatly increase a data throughput and a sending distance of a system without increasing a bandwidth or total transmit power, and a most powerful multi-antenna beamforming capability and a multi-user spatial multiplexing capability are provided. However, in the MIMO technology, interference is also prone to occur between the plurality of antennas.

Conventional frequency division duplexing (FDD) MIMO is used together with a conventional multi-antenna algorithm, for example, a multi-user (MU) zero-forcing precoding algorithm (a method for theoretically completely eliminating inter-user interference based on a linear precoding matrix and channel information of paired users). However, in FDD, channel information depends on user measurement and reporting. Because of limitation of a terminal capability and codebook precision, accuracy of the channel information cannot be ensured. This greatly restricts performance of the MIMO. Consequently, the MU zero-forcing precoding algorithm has a poor capability of mitigating inaccurate channel information. The inaccurate channel information severely affects accuracy of a MU precoding weight. As a result, the inter-user interference cannot be completely suppressed.

SUMMARY

Embodiments provide a data transmission method and apparatus to improve power utilization and data transmission quality.

A first aspect of embodiments provides a data transmission method, including: receiving a first precoding matrix indicator (PMI) from a terminal, where the first PMI indicates a first weight matrix; determining a second weight matrix based on the first weight matrix; determining a non-equal power weight matrix based on a non-equal coefficient matrix and the second weight matrix; and sending data to the terminal based on the non-equal power weight matrix.

In the foregoing aspect, an execution body is a network device. The network device determines the second weight matrix based on the first weight matrix indicated by the first PMI fed back by the terminal, and then converts the second weight matrix into the non-equal power weight matrix based on the non-equal coefficient matrix, so that the network device can send data with non-equal power on different radio frequency channels. This improves power utilization, implements a better beam side lobe, better mitigates a performance loss caused by inaccurate channel information, and improves data transmission quality.

In a possible implementation, the determining a non-equal power weight matrix based on a non-equal coefficient matrix and the second weight matrix in the foregoing step includes: determining the non-equal power weight matrix based on the non-equal coefficient matrix, an equivalent smoothing factor, and the second weight matrix.

In the foregoing possible implementation, the equivalent smoothing factor is added, to maximize transmit power of a wanted signal of a zero-forcing solution, and improve the signal transmission quality.

In a possible implementation, the method further includes: when network load is in an idle state, shutting down a radio frequency channel corresponding to a power weight in the non-equal power weight matrix that is less than a preset threshold.

In the foregoing possible implementation, the radio frequency channel corresponding to the power weight in the non-equal power weight matrix that is less than the preset threshold is shut down. A channel with minimum power is preferentially shut down, and the shutdown continues until a remaining high-power channel meets a power requirement. In this case, most channels can be shut down, to improve a power saving effect.

In a possible implementation, the non-equal power weight matrix is a power weight matrix with distribution of a large value in the middle and small values on two sides.

A second aspect of embodiments provides a data transmission apparatus that can implement any one of the methods in the first aspect or possible implementations of the first aspect. The apparatus includes a corresponding unit or module configured to perform the foregoing method. The unit or module included in the apparatus may be implemented through software and/or hardware. For example, the apparatus may be a network device, or may be a chip, a chip system, or a processor that supports a network device in implementing the foregoing method, or may be a logical module or software that can implement all or some functions of a network device.

A third aspect of embodiments provides a computer device, including a processor. The processor is coupled to a memory. The memory is configured to store instructions. When the instructions are executed by the processor, the computer device is enabled to implement the method in any one of the first aspect or possible implementations of the first aspect. For example, the computer device may be a network device, or may be a chip or a chip system that supports a network device in implementing the foregoing method.

A fourth aspect of embodiments provides a non-transitory computer-readable storage medium. The non-transitory computer-readable storage medium stores instructions. When the instructions are executed by a processor, the method in any one of the first aspect or possible implementations of the first aspect is implemented.

A fifth aspect of embodiments provides a computer program product. The computer program product includes computer program code. When the computer program code is executed on a computer, the method in any one of the first aspect or possible implementations of the first aspect is implemented.

DESCRIPTION OF EMBODIMENTS

Embodiments provide a data transmission method and apparatus, to improve power utilization and data transmission quality.

The following describes embodiments with reference to accompanying drawings. It is clear that the described embodiments are merely some, rather than all, of the possible embodiments. A person of ordinary skill in the art may know that with evolution of technologies and emergence of a new scenario, solutions according to embodiments are also applicable to similar problems.

In the embodiments and accompanying drawings, the terms "first", "second", and the like are intended to distinguish between similar objects, but do not necessarily indicate a specific order or sequence. It should be understood that the data termed in such a way is interchangeable in proper circumstances so that embodiments described herein can be implemented in an order other than the order illustrated or described herein. In addition, the terms "include" and "have" and any variants thereof are intended to cover a non-exclusive inclusion. For example, a process, a method, a system, a product, or a device that includes a series of steps or units is not necessarily limited to those expressly listed steps or units, but may include other steps or units not expressly listed or inherent to such a process, method, product, or device.

The term "example" herein refers to "can be used as an example, an embodiment, or an illustration". Any embodiment described as "an example" is not necessarily explained as being superior or better than other embodiments.

In addition, to better describe the embodiments, numerous specific details are given in the following specific implementations. A person skilled in the art should understand that the embodiments can also be implemented without some specific details. In some instances, methods, means, elements, and circuits that are well-known to a person skilled in the art are not described in detail, so that the subject matter of the embodiments is highlighted.

Figure 1:
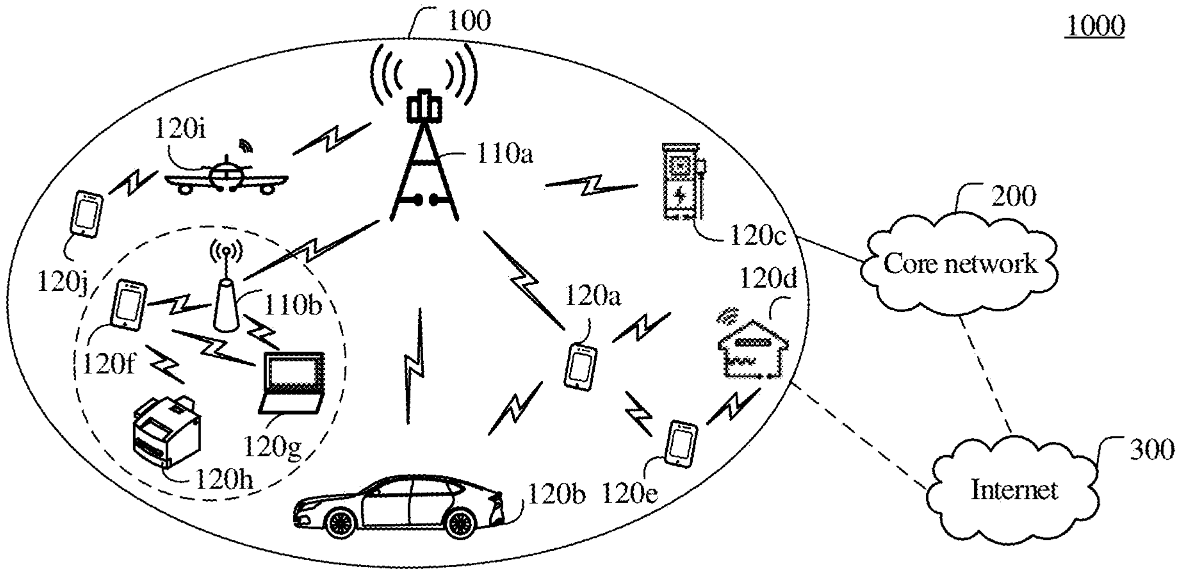
FIG. 1 is a diagram of an architecture of a communication system according to an embodiment.

FIG. 1 is a diagram of an architecture of a communication system 1000 applied to an embodiment. As shown in FIG. 1, the communication system includes a radio access network 100 and a core network 200. Optionally, the communication system 1000 may further include an internet 300. The radio access network 100 may include at least one radio access network device (for example, 110*a* and 110*b* in FIG. 1), and may further include at least one terminal (for example, 120*a* to 120*j* in FIG. 1). The terminal is connected to the radio access network device in a wireless manner, and the radio access network device is connected to the core network in a wireless or wired manner. A core network device and the radio access network device may be different physical devices that are independent of each other, or a function of the core network device and a logic function of the radio access network device may be integrated into a same physical device, or a part of functions of the core network device and a part of functions of the radio access network device may be integrated into one physical device. Terminals may be connected to each other in a wired or wireless manner, and radio access network devices may be connected to each other in a wired or wireless manner. FIG. 1 is merely a diagram. The communication system may further include another network device, for example, may further include a wireless repeater and a wireless backhaul device. These are not drawn in FIG. 1.

The radio access network device (or sometimes referred to as a network device) may be a base station, an evolved NodeB (eNodeB), a transmission reception point (TRP), a next generation NodeB (gNB) in a 5th generation (5G) mobile communication system, a next-generation base station in a 6th generation (6G) mobile communication system, a base station in a future mobile communication system, an access node in a Wi-Fi system, or the like; or may be a module or unit that completes a part of functions of a base station, for example, may be a central unit (CU), or may be a distributed unit (DU). The radio access network device may be a macro base station (for example, 110*a* in FIG. 1), or may be a micro base station or an indoor base station (for example, 110*b* in FIG. 1), or may be a relay node, a donor node, or the like. It may be understood that all or some functions of the radio access network device in the embodiments may alternatively be implemented by using a software function running on hardware, or may be implemented by using an instantiated virtualization function on a platform (for example, a cloud platform). A specific technology and a specific device form used by the radio access network device are not limited. For ease of description, the following uses an example in which a base station is used as a radio access network device for description.

The terminal may also be referred to as a terminal device, user equipment (UE), a mobile station, a mobile terminal, or the like. The terminal may be widely used in various scenarios, for example, device-to-device (D2D) communication, vehicle-to-thing (V2X) communication, machine-type communication (MTC), internet of things (IoT), virtual reality, augmented reality, industrial control, autonomous driving, telemedicine, smart grid, smart furniture, smart office, smart wearables, smart transportation, and smart city. The terminal may be a mobile phone, a tablet computer, a computer with a wireless transceiver function, a wearable device, a vehicle, an uncrewed aerial vehicle, a helicopter, an airplane, a ship, a robot, a robotic arm, a smart home device, or the like. A specific technology and a specific device form used by the terminal are not limited.

The base station and the terminal may be at fixed positions, or may be movable. The base station and the terminal may be deployed on land, including indoor or outdoor, handheld or vehicle-mounted; or may be deployed on water; or may further be deployed on an airplane, a balloon, or a satellite in the air. Application scenarios of the base station and the terminal are not limited.

Roles of the base station and the terminal may be relative. For example, a helicopter or an uncrewed aerial vehicle 120*i* in FIG. 1 may be configured as a mobile base station. For the terminal 120*j* that accesses the radio access network 100 through 120*i*, the terminal 120*i* is a base station. However, for the base station 110*a*, 120*i* is a terminal. That is, 110*a* and 120*i* communicate with each other through a wireless air interface protocol. Also, 110*a* and 120*i* may alternatively communicate with each other through an interface protocol between base stations. In this case, relative to 110*a*, 120*i* is also a base station. Therefore, both the base station and the terminal may be collectively referred to as a communication apparatus. 110*a* and 110*b* in FIG. 1 may be referred to as communication apparatuses having a base station function, and 120*a* to 120*j* in FIG. 1 may be referred to as communication apparatuses having a terminal function.

Communication between a base station and a terminal, between base stations, and between terminals may be performed through a licensed spectrum, or may be performed through an unlicensed spectrum, or may be performed through both a licensed spectrum and an unlicensed spectrum. Communication may be performed through a spectrum below 6 gigahertz (GHz), communication may be performed through a spectrum above 6 GHz, or communication may be performed through both a spectrum below 6 GHz and a spectrum above 6 GHz. A spectrum resource used for wireless communication is not limited.

In embodiments, a function of the base station may alternatively be performed by a module (for example, a chip) in the base station, or may be performed by a control subsystem including a base station function. The control subsystem including the base station function herein may be a control center in the foregoing terminal application scenarios such as the smart grid, the industrial control, the intelligent transportation, and the smart city. Alternatively, a function of the terminal may be performed by a module (such as a chip or a modem) in the terminal, or may be performed by an apparatus including a terminal function.

In the embodiments, the base station sends a downlink signal (such as a synchronization signal or a downlink reference signal) or downlink information to the terminal. The downlink information is carried on a downlink channel. The terminal sends an uplink signal (such as an uplink reference signal) or uplink information to the base station. The uplink information is carried on an uplink channel.

A multi-antenna multiple-input multiple-output (MIMO) technology is a key technology in current 5G and 4G communication systems. In the technology, a plurality of antennas configured on a base station side and a plurality of antennas configured on a terminal side are used, to independently send signals on the plurality of antennas at the transmit end, and receive and restore original information on the plurality of antennas at the receive end. This may greatly increase a data throughput and a sending distance of a system without increasing a bandwidth or total transmit power, and a most powerful multi-antenna beamforming capability and a multi-user spatial multiplexing capability are provided. However, in the MIMO technology, interference is also prone to occur between the plurality of antennas, which affects communication quality.

Conventional frequency division duplexing (FDD) MIMO uses a conventional multi-antenna algorithm, for example, a multi-user (MU) zero-forcing precoding algorithm (a method for theoretically completely eliminating inter-user interference based on a linear precoding matrix and channel information of paired users). However, in FDD, channel information depends on user measurement and reporting. Because of limitation of a terminal capability and codebook precision, accuracy of the channel information cannot be ensured. This greatly restricts performance of the MIMO. Consequently, the MU zero-forcing precoding algorithm has a poor capability of mitigating inaccurate channel information. The inaccurate channel information severely affects accuracy of a MU precoding weight. As a result, the inter-user interference cannot be completely suppressed.

To resolve the foregoing problem, an embodiment provides a data transmission method. The method is described as follows.

Figure 2:
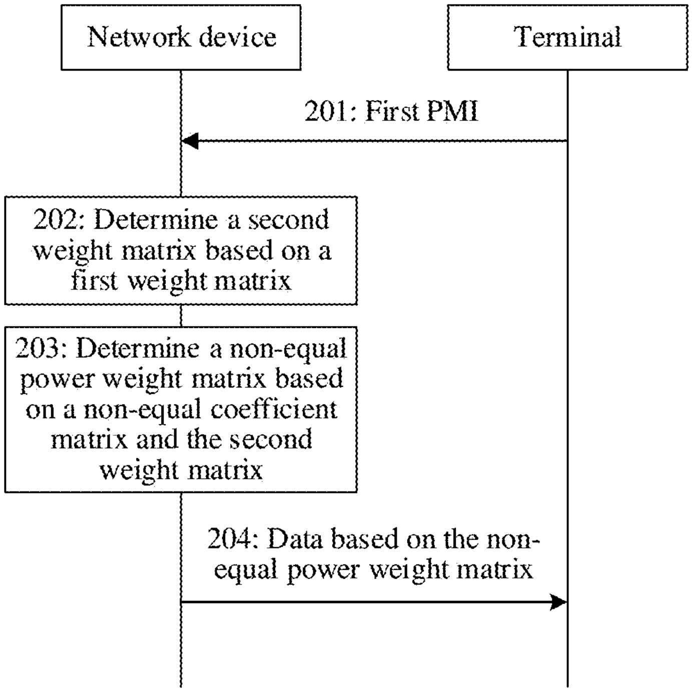
FIG. 2 is a flowchart of a data transmission method according to an embodiment.

FIG. 2 is a flowchart of a data transmission method according to an embodiment. The method includes:

Step 201: A terminal sends a first precoding matrix indicator (PMI) to a network device. Correspondingly, the network device receives the first PMI from the terminal. The first PMI indicates a first weight matrix.

In embodiments, the network device sends downlink data and a downlink reference signal, and the terminal receives the downlink data sent by the network device, and may feed back, to the network device, whether the downlink data is successfully received. The terminal may further perform downlink channel quality measurement by using the downlink reference signal sent by the network device, and feed back related measurement information to the network device. The terminal may send uplink data and an uplink reference signal to the network device. The network device receives the uplink data sent by the terminal, and may indicate, to the terminal, whether the uplink data is successfully received. The network device may further perform channel estimation and channel measurement by using the uplink reference signal sent by the terminal.

The network device may send a channel state information (CSI) reference signal (CSI-RS) to the terminal, so that the terminal obtains channel state information. The network device may weight the CSI-RS based on a preset weight. By using the preset weight, a beam gain can be increased, and reference signal received quality of the terminal can be improved. After receiving the CSI-RS, the terminal may determine a first weight based on the CSI-RS, and feed back, to the network device, the first PMI indicating the first weight.

Step 202: The network device determines a second weight matrix based on the first weight matrix.

In this embodiment, after receiving the first PMI, the network device may obtain the first weight matrix based on the first PMI, and determine the second weight matrix based on the first weight matrix. In embodiments, $W_2$ is used to represent the second weight matrix, and $W_1$ is the first weight matrix.

Step 203: The network device determines a non-equal power weight matrix based on a non-equal coefficient matrix and the second weight matrix.

In this embodiment, non-equal power amplification is implemented on radio frequency channels of the network device, and under limitation of total power of all radio frequency channels, non-equal power signal transmission is implemented on different radio frequency channels. In embodiments, an element in the non-equal coefficient matrix may be used to limit an element in the second weight matrix, to represent non-equal power of the radio frequency channels. For example, after determining the second weight matrix, the network device may determine the non-equal power weight matrix in this solution based on the non-equal coefficient matrix.

The non-equal power weight matrix is determined based on the non-equal coefficient matrix. $W_{NEP}$ represents a non-equal power (NEP) precoding matrix, and a sum of squares of elements in each row cannot exceed respective channel power. It is assumed that the following formula exists:

$$W_{NEP} = P^{\frac{1}{2}} W_2$$

The non-equal coefficient matrix is as follows:

$$P = \begin{bmatrix} P_1 & & \\ & \ddots & \\ & & P_i \end{bmatrix}$$

$P_i$ represents a radio frequency power coefficient of an it radio frequency channel.

A signal model is further rewritten as follows:

$$y = HP^{\frac{1}{2}} W_2 x + n = \overline{H} W_2 x + n$$

y represents a signal received by the terminal, H represents a channel through which data passes, x represents sent data, and n represents interference and noise experienced when the signal passes through the channel.

The foregoing process is called equivalent channelization processing, that is, conversion into an equal power model corresponding to an equivalent channel $\breve{H}$. Normal zero forcing can be used:

$$W_2 = \overline{H}^{\dagger}\left(\overline{H}\,\overline{H}^{\dagger}\right)^{-1} = P^{\frac{1}{2}} H^{\dagger}\left(HPH^{\dagger}\right)^{-1}$$

The channel H may be obtained based on the first weight matrix $W_1$. $W_1$ reflects estimation on the channel H. $(.)^{\dagger}$ represents conjugate transpose of a matrix. $W_1 = H^{\dagger}$, that is, $$H = W_1^{\dagger}$$

The original matrix is substituted into the 1st formula, and then:

$$W_{NEP} = P^{\frac{1}{2}} W_2 = PH^{\dagger}\left(HPH^{\dagger}\right)^{-1}$$

Column normalization and weight normalization processing that is based on channel power limitation further need to be performed on a final solution, that is, $W_{NEP}PH^{\dagger}(HPH^{\dagger})^{-1}\Psi$. $\Psi$ is a diagonal matrix. First, each diagonal element may be for normalizing energy of each column of $PH^{\dagger}(HPH^{\dagger})^{-1}\Psi$. Next, a square sum of elements in each row of an obtained column normalization matrix is then calculated, to obtain $a_1, \ldots, a_i$, and the entire matrix is multiplied by $$\min\left\{\sqrt{\frac{P_1}{a_1}}, \ldots, \sqrt{\frac{P_i}{a_i}}\right\},$$

so that transmit power of each channel meets a maximum power limit of the channel, to implement MU zero forcing on non-equal power of channels on a base station side. The foregoing two steps of processing may be represented by a processing manner of multiplying the diagonal matrix $\Psi$.

Figure 3:
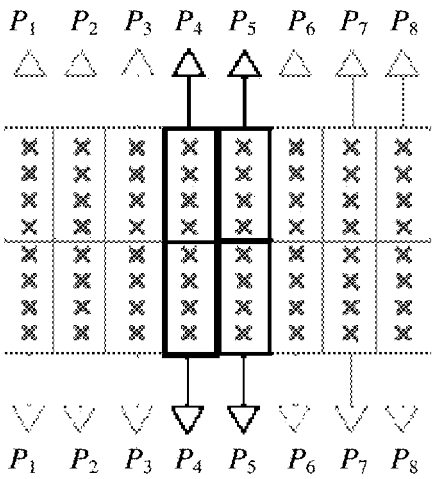
FIG. 3 is a diagram of an antenna according to an embodiment.

The non-equal power weight matrix is a power weight matrix with distribution of a large value in the middle and small values on two sides. FIG. 3 is a diagram of an antenna according to an embodiment.

MIMO antennas can be arranged in N horizontal columns and M vertical rows.

Non-equal power can be implemented on channels in a horizontal dimension or a vertical dimension. The horizontal dimension is used as an example. Assuming that eight horizontal columns of antennas correspond to eight channels and maximum power of a module is 400 W, distribution of non-equal power of the channels can be:

$[P_1\ P_2\ \ldots\ P_8]$=[6.5 8.5 15 20 20 15 8.5 6.5]W or $[P_1\ P_2\ \ldots\ P_8]$=[10 10 10 20 20 10 10 10]W and other similar distribution that meets a power distribution principle of a large value in the middle and small values on two sides.

In embodiments, when a non-equal power weight matrix is determined, a new equivalent smoothing factor $\alpha$ may be further introduced, and $\alpha \in [0,1]$, so that $$W_{NEP} = P^{\alpha} H^{\dagger}\left(HP^{\alpha}H^{\dagger}\right)^{-1}\Psi$$

$\alpha$ may be set to a typical value 0.5, or may be obtained by performing optimization to maximize transmit power of a wanted signal of a zero-forcing solution:

$$\alpha = \operatorname{argmax}\left\{\operatorname{trace}\left\{H\left(P^{\alpha}H^{\dagger}\left(HP^{\alpha}H^{\dagger}\right)^{-1}\Psi\right)\right\}\right\}$$

This maximizes signal power and improves signal transmission quality.

In terms of saving power, when network load is in an idle state, a channel can be shut down to save power. After a conventional MIMO channel is shut down, power and a beamforming capability of the conventional MIMO channel both decrease. In addition, to ensure basic network coverage, a power limit that needs to be maintained needs to be ensured. Consequently, it is difficult to completely shut down channels. This restricts a power saving effect during the idle state. In embodiments, a radio frequency channel corresponding to a power weight in $W_{NEP}$ that is less than a preset threshold may be shut down. A channel with minimum power is preferentially shut down, and the shutdown continues until a remaining high-power channel meets a power requirement. In this case, most channels can be shut down, to improve a power saving effect.

For example, a 400 W MIMO module ensures basic user access during an idle state of a network, for example, ensures 160 W module power. In this way, received quality of a cell broadcast signal does not deteriorate, and user access is not affected.

Based on the power limit, a channel with lower power is preferentially shut down. For example, in non-equal power distribution of the channels $[P_1\ P_2\ \ldots\ P_8]$=[6.5 8.5 15 20 20 15 8.5 6.5], the channel with the minimum power is preferentially shut down, and the shutdown continues until the remaining high-power channel meets the power requirement. In this example, 6×2×2=24 channels of 6.5 W, 8.5 W, and 15 W can be shut down, and remaining eight 20 W high-power channels can meet a basic power requirement for power saving. In a solution in which a radio frequency channel is shut down during the idle state, the power weight matrix may not be in a manner in which a largest value is in the middle and smaller values are on two sides.

Step 204: The network device sends data to the terminal based on the non-equal power weight matrix.

In embodiments, after determining the non-equal power weight matrix, the network device may weight, by using the determined non-equal power weight matrix, the service data to be sent to the terminal, and then send the weighted service data to the terminal. The terminal may determine the non-equal power weight matrix based on a demodulation reference signal (DMRS) between the base station and the terminal, and then process the received signal y based on the non-equal power weight matrix, to obtain received data.

In the solution in embodiments, the second weight matrix is determined based on the first weight matrix indicated by the first PMI fed back by the terminal, and then the second weight matrix is converted into the non-equal power weight matrix based on the non-equal coefficient matrix, so that the network device can send data with non-equal power on different radio frequency channels. This improves power utilization, implements a better beam side lobe, better mitigates a performance loss caused by inaccurate channel information, and improves data transmission quality.

The foregoing describes the data transmission method, and the following describes an apparatus for performing the method.

Figure 4:
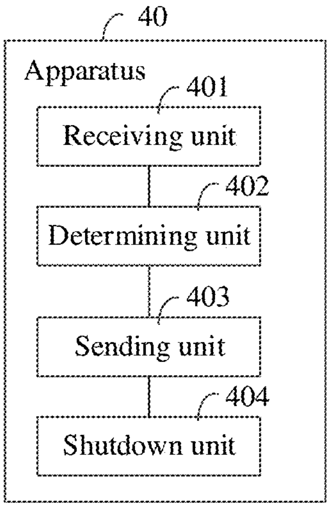
FIG. 4 is a diagram of a structure of a data transmission apparatus according to an embodiment.

FIG. 4 is a diagram of a structure of a data transmission apparatus according to an embodiment. The apparatus 40 includes:

a receiving unit 401, configured to receive a first precoding matrix indicator PMI from a terminal, where the first PMI indicates a first weight matrix;

a determining unit 402, configured to: determine a second weight matrix based on the first weight matrix, and determine a non-equal power weight matrix based on a non-equal coefficient matrix and the second weight matrix; and a sending unit 403, configured to send data to the terminal based on the non-equal power weight matrix.

Optionally, the determining unit 402 is configured to determine the non-equal power weight matrix based on the non-equal coefficient matrix, an equivalent smoothing factor, and the second weight matrix.

Optionally, the apparatus 40 further includes a shutdown unit 404. The shutdown unit 404 is configured to: when network load is in an idle state, shut down a channel corresponding to a power weight in the non-equal power weight matrix that is less than a preset threshold.

Optionally, the non-equal power weight matrix is a power weight matrix with distribution of a large value in the middle and small values on two sides.

The receiving unit 401 of the apparatus 40 is configured to perform step 201 in the method embodiment in FIG. 2. The determining unit 402 of the apparatus 40 is configured to perform step 202 and step 203 in the method embodiment in FIG. 2. The sending unit 403 of the apparatus 40 is configured to perform step 204 and step 205 in the method embodiment in FIG. 2. Details are not described herein again.

Figure 5:
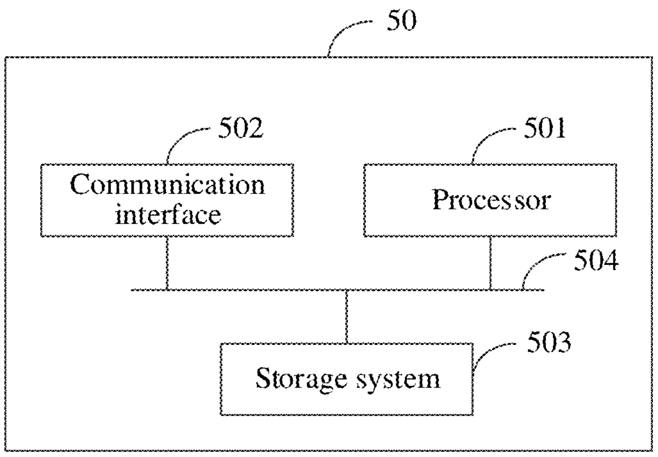
FIG. 5 is a diagram of a structure of a computer device according to an embodiment.

FIG. 5 is a diagram of a possible logic structure of a computer device 50 according to an embodiment. The computer device 50 includes a processor 501, a communication interface 502, a storage system 503, and a bus 504. The processor 501, the communication interface 502, and the storage system 503 are connected to each other through the bus 504. In embodiments, the processor 501 is configured to control and manage an action of the computer device 50. For example, the processor 501 is configured to perform the steps performed by the network device in the method embodiment in FIG. 2. The communication interface 502 may be configured to support the computer device 50 to communicate. The storage system 503 is configured to store program code and data of the computer device 50.

For example, the processor 501 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logic blocks, modules, and circuits described with reference to content in the embodiments. Alternatively, the processor 501 may be a combination of processors implementing a computing function, for example, a combination of one or more microprocessors, or a combination of a digital signal processor and a microprocessor. The bus 504 may be a peripheral component interconnect (PCI) bus, an extended industry standard architecture (EISA) bus, or the like. The bus may be classified into an address bus, a data bus, a control bus, and the like. For ease of representation, only one bold line is used for representation in FIG. 5, but it does not indicate that there is only one bus or only one type of bus.

The transceiver unit 502 in the apparatus 50 is equivalent to the communication interface 502 in the computer device 50, and the processing unit 501 in the apparatus 50 is equivalent to the processor 501 in the computer device 50.

The computer device 50 in this embodiment may correspond to the network device in the method embodiment in FIG. 2. The communication interface 502 in the computer device 50 may implement functions and/or steps implemented by the network device in the method embodiment in FIG. 2. For brevity, details are not described herein again.

It should be understood that division of the units in the foregoing apparatus is merely logic function division. During actual implementation, all or some of the units may be integrated into one physical entity, or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. In an implementation process, steps in the foregoing methods or the foregoing units may be implemented by using a hardware integrated logic circuit in the processor element or may be implemented in a form in which the processing element invokes software.

In an example, a unit in any one of the foregoing apparatuses may be one or more integrated circuits configured to implement the foregoing method, for example, one or more application-specific integrated circuits (ASIC), or one or more microprocessors (DSP), or, one or more field programmable gate arrays (FPGA), or a combination of at least two of these integrated circuit forms. For another example, when a unit in the apparatus may be implemented in a form of scheduling a program by a processing element, the processing element may be a general-purpose processor, for example, a central processing unit (CPU) or another processor that can invoke the program. For another example, the units may be integrated together and implemented in a system-on-chip (SoC) form.

Another embodiment further provides a non-transitory computer-readable storage medium. The non-transitory computer-readable storage medium stores computer-executable instructions. When a processor of a device executes the computer-executable instructions, the device performs the method performed by the network device in the foregoing method embodiment.

In another embodiment, a computer program product is further provided. The computer program product includes computer-executable instructions, and the computer-executable instructions are stored in a non-transitory computer-readable storage medium. When the processor of the device executes the computer-executable instructions, the device performs the method performed by the network device in the foregoing method embodiment.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided, it should be understood that the system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of embodiments.

In addition, functional units in embodiments may be integrated into one processing unit, each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a non-transitory computer-readable storage medium. Based on such an understanding, the solutions of the embodiments essentially, or the part contributing to the conventional technologies, or all or some of the solutions may be implemented in a form of a software product. The computer software product is stored in a storage medium, and includes several instructions for enabling a computer device (which may be a personal computer, a server, or a network device) to perform all or some of the steps of the methods described in the embodiments. The foregoing storage medium includes any medium that can store program code, such as a USB flash drive, a removable hard disk, a read-only memory (ROM), a random access memory (RAM), a magnetic disk, or an optical disc.

What is claimed is:

1. A method, comprising:

receiving a first precoding matrix indicator (PMI) from a terminal, wherein the first PMI indicates a first weight matrix;

determining a second weight matrix based on the first weight matrix;

determining a non-equal power weight matrix based on a non-equal coefficient matrix, an equivalent smoothing factor, and the second weight matrix, wherein the equivalent smoothing factor is an exponent applied to the non-equal coefficient matrix; and sending data to the terminal based on the non-equal power weight matrix.

2. The method according to claim 1, further comprising:

when network load is in an idle state, shutting down a radio frequency channel corresponding to a power weight in the non-equal power weight matrix that is less than a preset threshold.

3. The method according to claim 1, wherein the non-equal power weight matrix is a power weight matrix with distribution of a large value in the middle and small values on two sides.

4. The method of claim 2, further comprising:

shutting down a channel with minimum power.

5. The method of claim 4, further comprising:

continuing the shutdown until a remaining high-power channel meets a power requirement.

6. The method according to claim 1, wherein the equivalent smoothing factor is in a range of 0 to 1.

7. The method according to claim 1, wherein the equivalent smoothing factor is determined by performing optimization to maximize transmit power of a wanted signal of a zero-forcing solution.

8. An apparatus, comprising:

a processor; and a non-transitory computer-readable storage medium storing a program to be executed by the processor, the program including instructions to:

receive a first precoding matrix indicator (PMI) from a terminal, wherein the first PMI indicates a first weight matrix;

determine a second weight matrix based on the first weight matrix;

determine a non-equal power weight matrix based on a non-equal coefficient matrix, an equivalent smoothing factor, and the second weight matrix, wherein the equivalent smoothing factor is an exponent applied to the non-equal coefficient matrix; and send data to the terminal based on the non-equal power weight matrix.

9. The apparatus according to claim 8, wherein the program further includes instructions to:

when network load is in an idle state, shut down a radio frequency channel corresponding to a power weight in the non-equal power weight matrix that is less than a preset threshold.

10. The apparatus according to claim 8, wherein the non-equal power weight matrix is a power weight matrix with distribution of a large value in the middle and small values on two sides.

11. The apparatus of claim 9, wherein the program further includes instructions to:

shut down a channel with minimum power.

12. The apparatus of claim 11, wherein the program further includes instructions to:

continue the shutdown until a remaining high-power channel meets a power requirement.

13. The apparatus according to claim 8, wherein the equivalent smoothing factor is in a range of 0 to 1.

14. The apparatus according to claim 8, wherein the equivalent smoothing factor is determined by performing optimization to maximize transmit power of a wanted signal of a zero-forcing solution.

* * * * *